(12) United States Patent
Yoshida (10) Patent No.: US 6,298,414 B1
(45) Date of Patent: *Oct. 2, 2001

(54) METHOD AND MEDIUM FOR RECORDING DIGITAL DATA

(75) Inventor: Masaki Yoshida, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,390

(22) Filed: Apr. 8, 1998

(30) Foreign Application Priority Data

Apr. 11, 1997 (JP) .................................... 9-094212

(51) Int. Cl.$^7$ ..................................................... G06F 12/00
(52) U.S. Cl. .............................. 711/111; 711/112; 710/68
(58) Field of Search ........................... 711/111, 112, 114; 710/68

(56) References Cited

U.S. PATENT DOCUMENTS

| | | | |
|---|---|---|---|
| 5,237,675 | * 8/1993 | Hannon, Jr. .............................. | 710/68 |
| 5,394,534 | * 2/1995 | Kulakowski et al. ................ | 711/112 |
| 5,581,724 | * 12/1996 | Belsan et al. .......................... | 711/114 |
| 5,586,280 | 12/1996 | Simms . | |
| 5,627,995 | * 5/1997 | Miller et al. ........................... | 711/171 |
| 5,778,255 | * 7/1998 | Clark et al. ............................. | 710/68 |

FOREIGN PATENT DOCUMENTS

| | | |
|---|---|---|
| 0 406 188 | 1/1991 | (EP) . |
| 0 637 025 | 2/1995 | (EP) . |
| WO 97/08696 | 3/1997 | (WO) . |

OTHER PUBLICATIONS

J. Ziv and A. Lempel, "Compression of Individual Sequences via Variable–Rate Coding," IEEE Transactions on Information Theory, Sep., 1978, pp. 530–536.*
Terry A. Welch, "A Technique for High Performance Data Compression," IEEE Computer, Jun. 1984, pp. 8–19.*

* cited by examiner

*Primary Examiner*—Matthew Kim
*Assistant Examiner*—Christian P. Chace
(74) *Attorney, Agent, or Firm*—Frommer Lawrence & Haug LLP.; William S. Frommer; Bruno Polito (57) ABSTRACT

A digital data recording method is provided where the efficiency of use of the recording medium storage area for recording data in a sequence is increased and a desired data can be retrieved at a higher speed. When a record n in an entity is terminated at the trailing end of a group N, a record n+1 following the record n is recorded in a group N+1. When a record n extends up to the group N+1, a header H2' attributed to the group N and a front part of the record n as well as the preceding records 1 to n−1 are designated as another entity E2'. The remaining or rear part of the record n is designated as an entity E3' and recorded in the group N+1 as added with a header H3'. Then, the record n+1 is designated as an entity E4 and recorded in the group N+1 as added with a header H4.

6 Claims, 8 Drawing Sheets

ETE : ENTIRE ENTITY
SPE : START PART OF ENTITY
MEP : MIDDLE PART OF ENTITY
LPE : LAST PART OF ENTITY
* : ACCESS POINT

METHOD AND MEDIUM FOR RECORDING DIGITAL DATA

BACKGROUND OF THE INVENTION

1. Field of the Invention

The present invention relates to a digital data recording method for recording digital data on a recording medium and to a digital data recording medium for saving digital data.

2. Description of Related Art

One of apparatuses for recording and playing back digital data on recording mediums is known as a streaming tape drive. Such streaming tape drives having recording capacities as having recording capacities as large as hundreds of megabytes, although their actual capacity depends on the length of a magnetic tape used as a recording medium. Further such tapes drives are commonly used for backup storage of bulk data which has been saved on a mass recording medium such as a hard disk in a computer. The streaming tape drive is also used for saving image data which is often huge in quantity.

The streaming tape drive is provided with a rotary head operating in a helical scanning mode to record and play back a data on a magnetic tape of the 8-mm VTR format. An example of a conventional streaming tape drives is disclosed in PCT Application No. PCT/JP96/02345 (filed on Aug. 22, 1996) as invented by the same applicant.

The streaming data drive employing a magnetic tape of the 8-mm VTR format as a recording medium includes an input/output interface such as a small computer system interface (SCSI) for data to be recorded or played back.

In recording, data supplied, e.g. from a host computer, is introduced via the SCSI interface to the streaming tape drive. The data may be carried in units of a fixed length data groups and if necessary, compressed by a known data compression method and temporarily saved in a buffer memory. The data released from the buffer memory is then supplied in units of a predetermined data length termed a "group" to a record/playback system where it is recorded on a magnetic tape with a rotary head.

In playback, the data saved on the magnetic recording tape is read out by the rotary head and also saved temporarily in a buffer memory. The data is released from the memory buffer and, when having been compressed in the recording, expanded by a known expansion method before being transferred via the SCSI interface to a host computer.

It is desired that the storage efficiency streaming tape drives or mass data record/playback apparatus be improved in order to allow for the recording of greater amounts of data on a given recording medium. It is also essential that the data saved on the medium is accessed and read at as a great a speed as possible.

SUMMARY OF THE INVENTION

The present invention is directed towards achieving the above requirements and its object is to provide a digital data recording method in which a magnetic tape used as the recording medium for recoding and/or playing back of data in sequences is increased in the efficiency of storage area usage is accessed at a higher speed to read desired one of the data therefrom and a digital data recording medium associated with the method.

A digital data recording method, according to the present invention, where a number of process units of data composed of a plurality of compressed data transmission units produced by compressing fixed length transmission units of data and a dictionary data unit indicative of the information of the compressed data transmission units are allocated to a series of recording units of a fixed length suited for a corresponding recording medium, comprises the steps of: examining whether or not one of the compressed data transmission units in each process unit to be allocated to two adjacent recording units is terminated at the trailing end of a preceding one of the two adjacent recording units for recording the process units into the recording units according to a result of the examination; when the compressed data transmission unit is terminated at the trailing end of the preceding recording unit, ending up the recording of the process unit at the trailing end and reconstructing and recording another process unit which carries the remaining of the compressed data transmission units of the current process unit into the other or succeeding one of the two adjacent recording units; and when the compressed data transmission unit is not terminated at the trailing end of the preceding recording unit, ending up the recording of the process unit at the end of the compressed data transmission unit which extends over the trailing end of the preceding recording unit and reconstructing and recording another process unit which carries the remaining of the compressed data transmission units of the current process unit into the other or succeeding one of the two adjacent recording units.

A digital data recording medium, according to the present invention, where a number of process units of data composed of a plurality of compressed data transmission units produced by compressing fixed length transmission units of data and a dictionary data unit indicative of the information of the compressed data transmission units are allocated and recorded into a series of recording units of a fixed length, is characterized by: when one of the compressed data transmission units in each process unit to be allocated to two adjacent recording units is terminated at the trailing end of a preceding one of the two adjacent recording units, ending up the recording of the process unit at the trailing end and reconstructing and recording another process unit which carries the remaining of the compressed data transmission units of the current process unit into the other or succeeding one of the two adjacent recording units; and when the compressed data transmission unit is not terminated at the trailing end of the preceding recording unit, ending up the recording of the process unit at the end of the compressed data transmission unit which extends over the trailing end of the preceding recording unit and reconstructing and recording another process unit which carries the remaining of the compressed data transmission units of the current process unit into the other or succeeding one of the two adjacent recording units.

DESCRIPTION OF PREFERRED EMBODIMENTS

Preferred embodiments of the digital data recording method and the digital data recording medium of the present invention will be described in more detail referring to the accompanying drawings.

The description of the present invention starts with a streaming tape drive which is an embodiment of the present invention.

Figure 1:
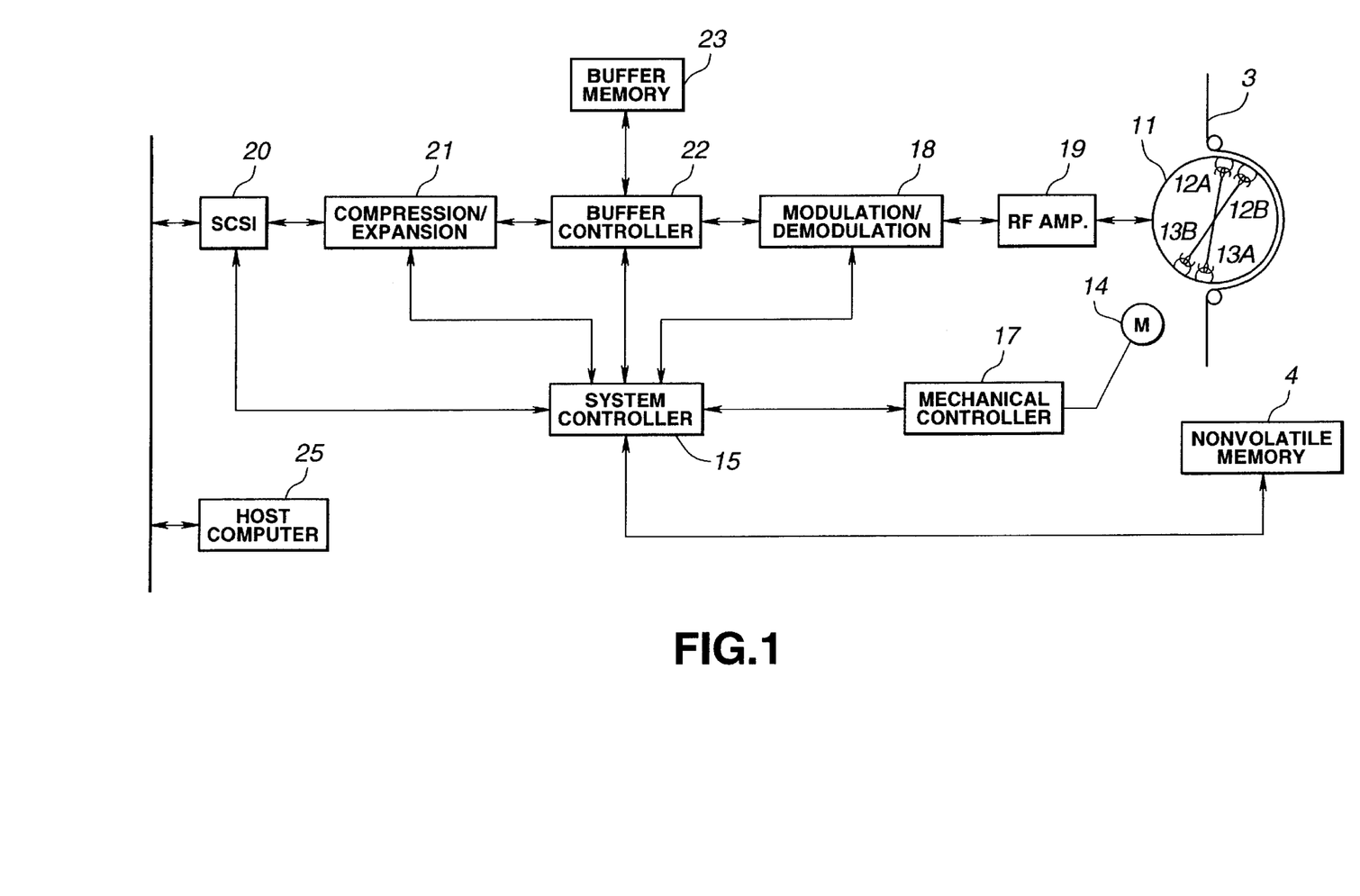
FIGS. 1 is a diagram showing a streaming tape drive.

FIG. 1 is a block diagram showing a primary part of the streaming tape drive. The streaming tape drive is of a helical scanning type for recording/playing back of data on a tape cassette of the 8-mm VTR format.

A rotary drum 11 includes, for example, two recording heads 12A and 12B and two playback heads 13A and 13B. The two recording heads 12A and 12B are arranged with their gaps adjacent to each other and with different azimuth angles. This arrangement is identical to that of the playback heads 13A and 13B. The rotary drum 11 is driven by a drum motor 14 for rotation at a constant speed and on which a magnetic tape 3 runs. The magnetic tape 3 is transferred by a tape running system including a capstan motor and pinch rollers (not shown).

A mechanical controller 17 is provided for controlling the rotation of the unshown capstan motor or a reel motor and providing servo control over the drum motor 14 and tracking control of the tape 3. The mechanical controller 17 is thus connected in two-way relationship with a system controller which controls the entire system.

The streaming tape drive also includes a SCSI 20 (small computer system interface) used as an input/output interface for data through which data is introduced in a sequence from a host computer 25 and transmitted to a compression/expansion circuit 21. The data is carried in units of a fixed data length called "record" explained later.

It may be possible in the system of the streaming tape drive to use an alternative mode for transmission of data in units of variable data length from the host computer 25. In this embodiment, the data is to be transmitted in units of a fixed length data records.

An action of the streaming tape drive for recording a data of interest on the magnetic tape 3 is now explained.

The compression/expansion circuit 21 subjects the data of interest to a proper compression process. The compression/expansion of the compression/expansion circuit 21 may be carried out by any applicable method, e.g. LZ coding.

LZ type coding comprises converting a set of characters into a specific code which is then saved in a dictionary, comparing each succeeding set of characters with the saved code, and when the set of characters matches with the code, converting the set into a code in the dictionary. If the set does not match with the existing code in the dictionary, it is converted into another code and saved in the dictionary. In this manner, each set of characters is converted into a coded form and thus compressed in the data size.

When the input data e.g. of image from the host computer 25 is in a compressed form, it is not processed in the compression/expansion circuit 21 and transmitted directly.

The determination of whether the compression process is performed or not may be executed using predetermined settings or by the system controller 15 considering a reference data supplied through the SCSI interface 20.

The data of compressed form from the compression/expansion circuit 21 is temporarily saved in a buffer memory 23 via a buffer controller 22. The data when released from the buffer memory 23 is transferred in units of the group of a fixed data length under the control action of the buffer controller 22 to a modulator/demodulator circuit 18. The unit of the group will be described later in more detail.

The modulator/demodulator circuit 18 modulates the data to a format suited for magnetic recording which is then supplied to an RF amplifier 19. The compressed data is amplified by the RF amplifier 19, transferred as a recording signal to the recording heads 12A and 12B, and recorded on the magnetic tape 3.

An action of the streaming tape drive for playing back the compressed data recorded on the magnetic tape 3 is also explained in brief.

The compressed data recorded on the magnetic tape 3 is read out by the playback heads 13A and 13*b*, played back as an RF playback signal, amplified by the RF amplifier 19, and demodulated by the modulator/demodulator circuit 18.

A demodulated form of the data from the modulator/demodulator circuit 18 is temporarily saved in the buffer memory 23 by the control action of the buffer controller 22 before supplied to the compression/expansion circuit 21.

The compression/expansion circuit 21 expands the data according to a control signal of the system controller 15. If the data is not of a compressed form, it is transmitted directly without the expansion process.

An expanded form of the data from the compression/expansion circuit 21 is delivered as a playback data from the SCSI interface 20 to the host computer 25 or another system.

The unit of data for transmission, compression/expansion, and recording/playback of digital data with the streaming tape drive is explained.

Figure 2A:
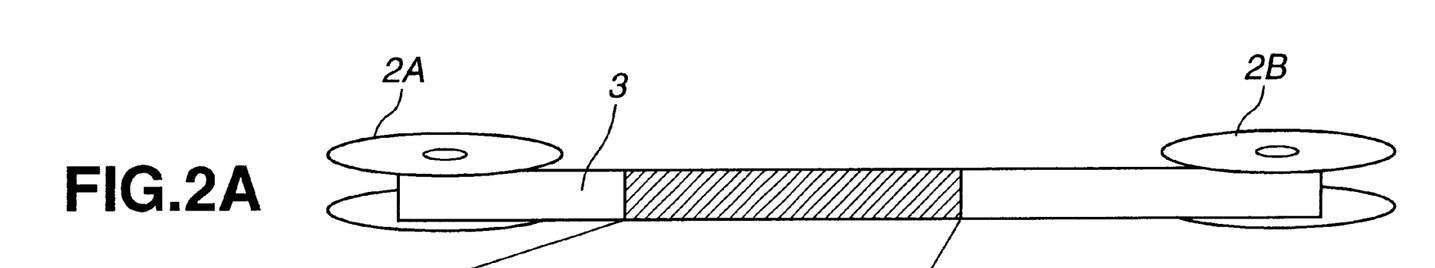
FIGS. 2A–D are an explanatory view showing different data units.
Figures 2B, 2C, 2D:
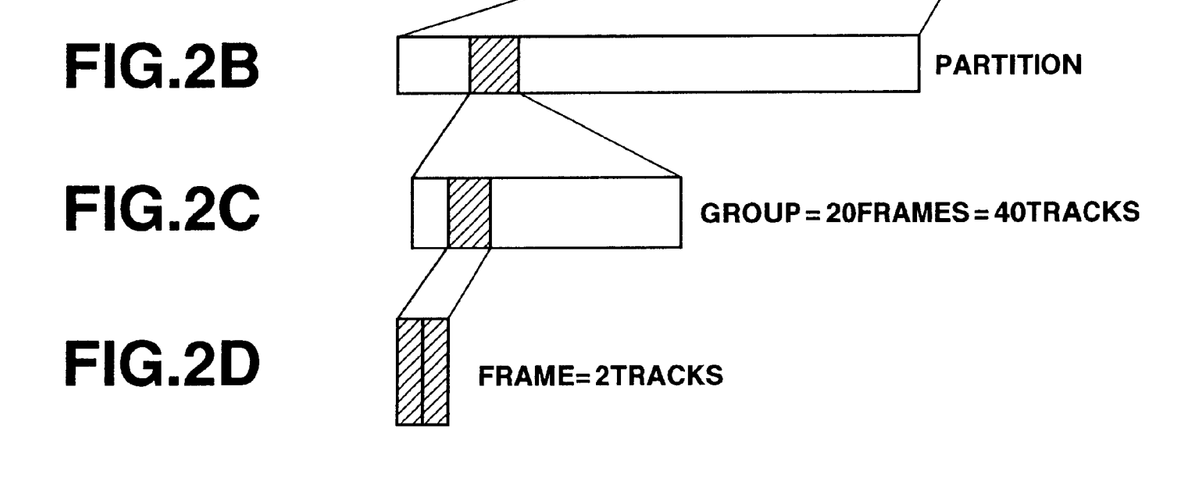

FIG. 2 illustrates how data units are recorded on the magnetic tape 3.

As shown in FIG. 2A, the magnetic tape 3 is wound between two reels 2A and 2B e.g. in a tape cassette.

In the streaming tape drive, the magnetic tape 3 may be divided into segments called partitions as shown in FIG. 2B. The number of the partitions may be 256 at maximum. Each partition can have a quantity of data recorded and played back independently.

The partition is divided into segments of a fixed length called the groups as shown in FIG. 2C. The data is recorded in the groups on the magnetic tape 3. A single group carries 20 frames of data and each frame consists of 2 tracks as shown in FIG. 2D. The group is thus composed of 40 tracks of the data.

Figure 3:
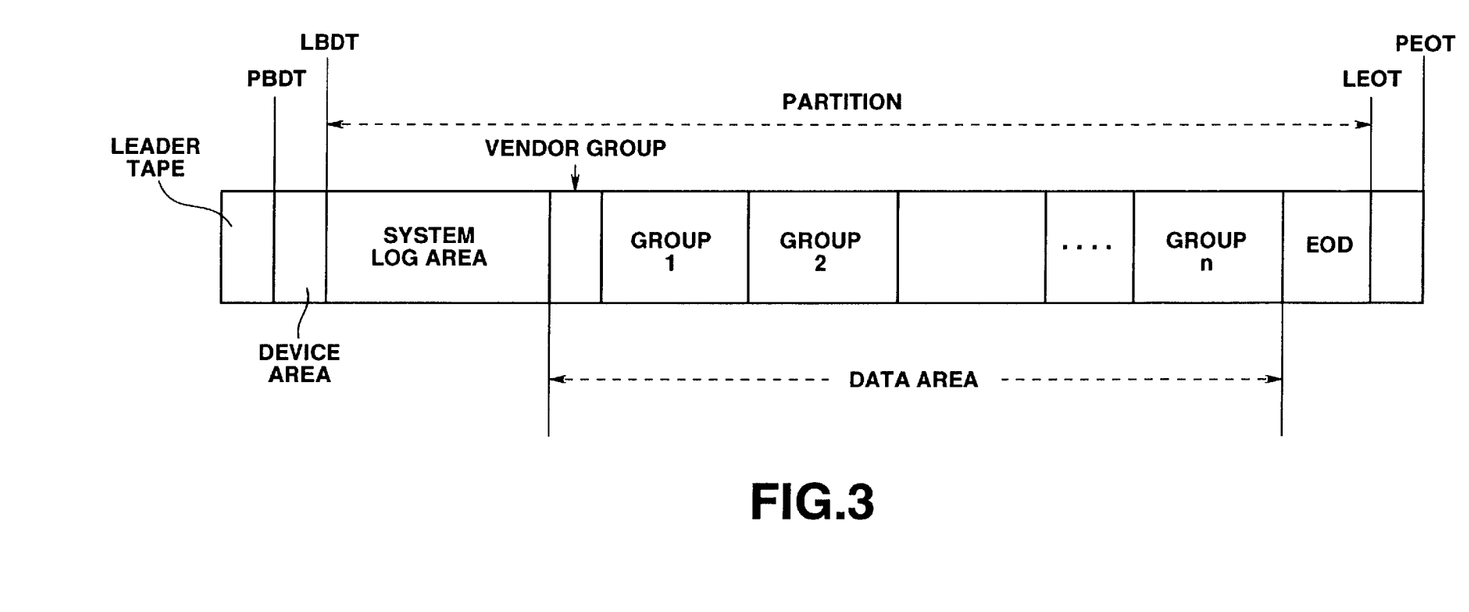
FIG. 3 is an explanatory view showing a data structure of one partition.

FIG. 3 shows a structure of the partition. The explanation is now based on one partition recorded on the magnetic tape 3.

A leader tape is provided in the leading end of the magnetic tape and followed by a device area for loading and unloading of the tape cassette. The head of the device area is known as physical beginning of tape (PBOT).

The device area is joined by a system log area for storage e.g. of a history of usage of the data and a data area for storage of the data. The head of the system log area is known as logical beginning of tape (LBOT).

A vender group area, wherein the information on a vender which produces and provides data is identified, is provided in the head of the data area, and data for several groups 1 to n is recorded on the magnetic tape. Subsequent to the last group n, end of data (EOD), which shows a termination of the partition, is provided. The last portion of the EOD area is known as logical end of tape (LEOT).

The tailing end of the magnetic tape is termed physical end of tape (PEOT).

Figure 4A:
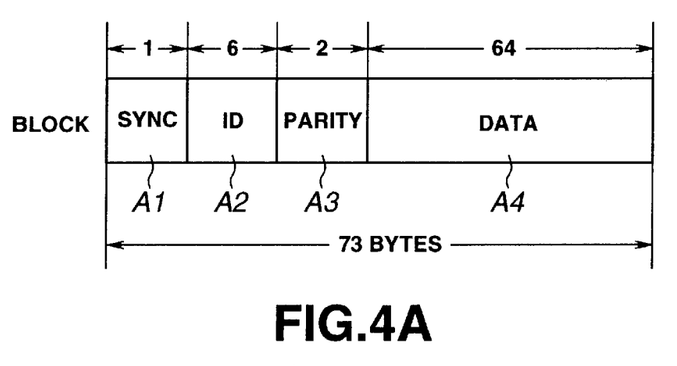
FIGS. 4A–B are an explanatory view showing a data structure of one track.
Figure 4B:
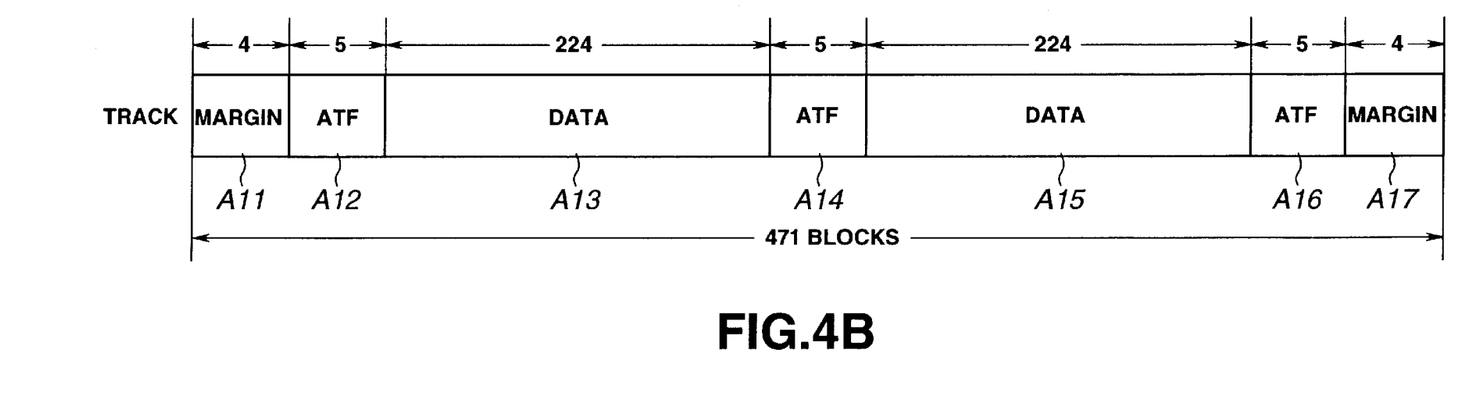

FIG. 4 illustrates structures of a block and the track.

FIG. 4A is the structure of the block which is composed of a fixed length unit of 73 bytes including 1 byte of sync data A1, 6 bytes of ID data A2, 2 bytes of error correction parity A3 for the ID data, and 64 bytes of main data A4.

FIG. 4B shows the structure of the track which is composed of 471 blocks. The track is provided at both ends two margins A11 and A17 of 4 blocks each. Two automatic track following (ATF) areas A12 and A16 are allocated after the margin A11 and before the margin A17 respectively. There is provided another ATF area A14 in the middle of the track. Each of the ATF areas A12, A14, and A16 comprises 5 blocks. Two data areas A13 and A15 of 224 blocks each are provided between the ATF areas A12 and A14 and between the ATF areas A14 and A16.

Figure 5:
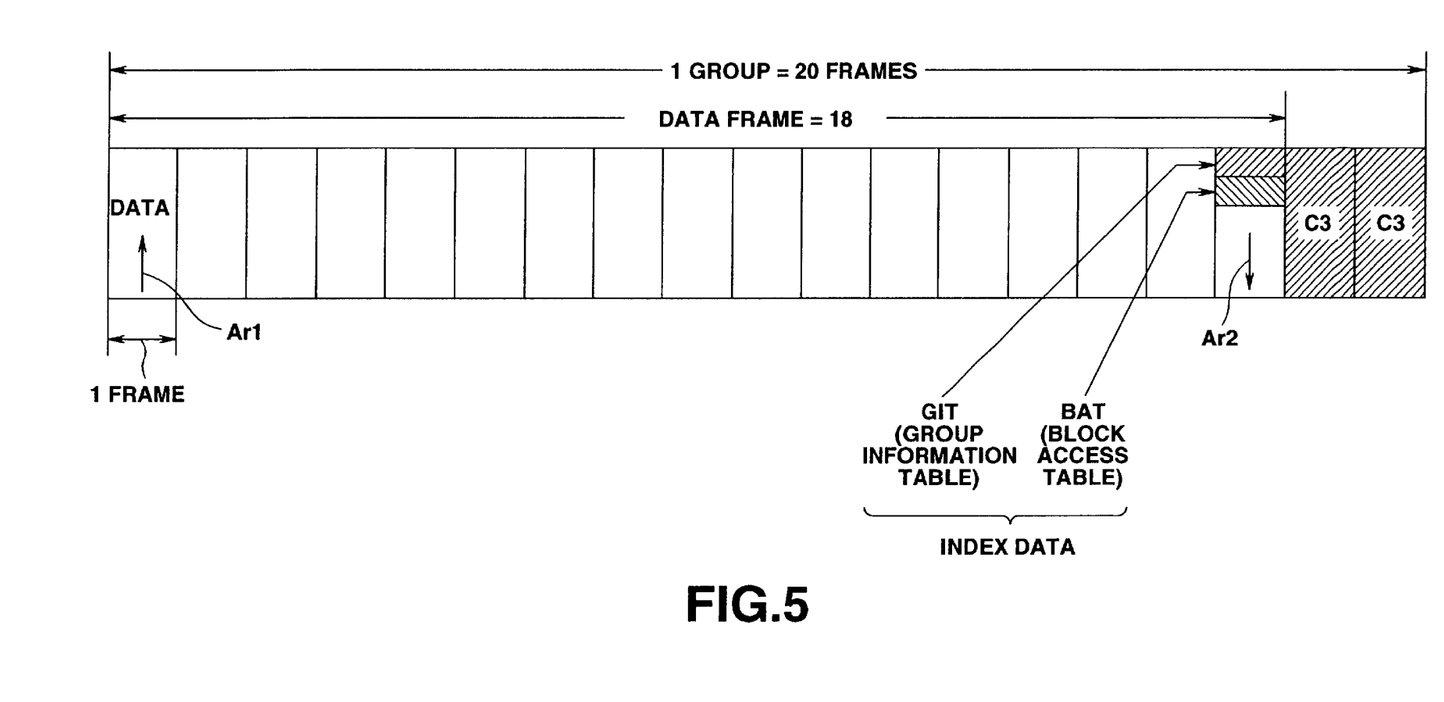
FIG. 5 is an explanatory view showing a data structure of one group.

FIG. 5 shows a structure of the group. As described, the group is composed of 20 frames. Two of the 20 frames of the group at the trailing end are parity frames C3 for error correction. Other parities C1 and C2 though not explained in detail may be arranged on the basis of one per track.

In the recording of data on the magnetic tape, the data is recorded in a sequence from the first frame of each group as denoted by the arrow Ar1. A data of group information table (GIT) indicative of the content of the group is saved in the 18th frame as scanned in the direction, denoted by the arrow Ar2, opposite to the direction of data recording. This is followed by recording a data of block access table (BAT) for controlling each entity (or record) in the group. The entity as a unit of data will be explained later in more detail.

The GIT may be 40 bytes of a fixed length data. BAT includes 4 bytes of access entry determined by the content of the group and may be a variable length data. For simplicity of the explanation, a combination of GIT and BAT is referred to as an index data hereinafter.

A procedure from compression of the data and to recording on the magnetic tape in groups is now explained in conjunction with the arrangement of the streaming tape drive shown in FIG. 1.

The data introduced from the host computer 25 is transmitted in the unit of a fixed length data called a record to the streaming tape drive. The record may be composed of 512 bytes of data.

If the input data needs not to be compressed by the compression/expansion circuit 21, its records are directly shifted to the groups which are stored on the magnetic tape 3. In the playback, the records of the data are read out from the magnetic tape 3 according to the index data of each group and transferred via the SCSI interface 20 to the host computer 25.

When the input data supplied in units of the record from the host computer 25 is compressed by the compression/ expansion circuit 21, it is turned in each record to a variable length data depending on the content of the record. This allows the compressed data not to be played back correctly if it has been recorded in the form of groups on the magnetic tape directly as described previously. It is thus necessary to modify the compressed data before dividing it into the groups.

Figures 6A, 6B:
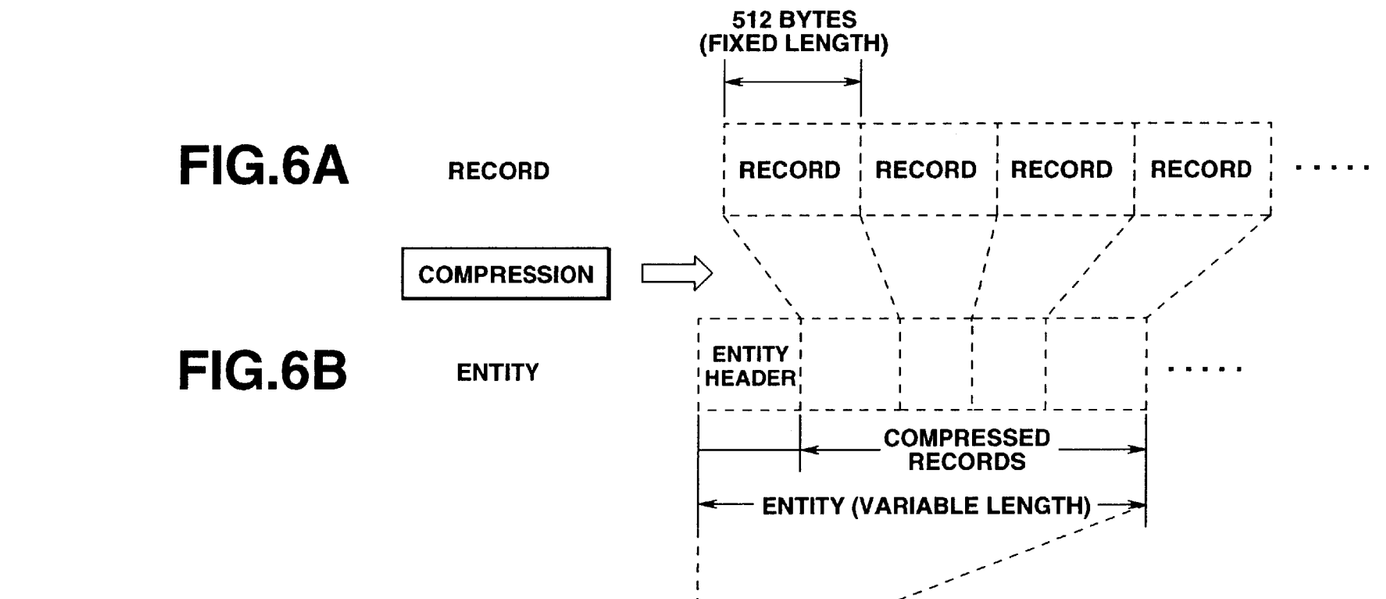
FIGS. 6A–C are an explanatory view of compressing the records of data and grouping compressed data.
Figure 6C:
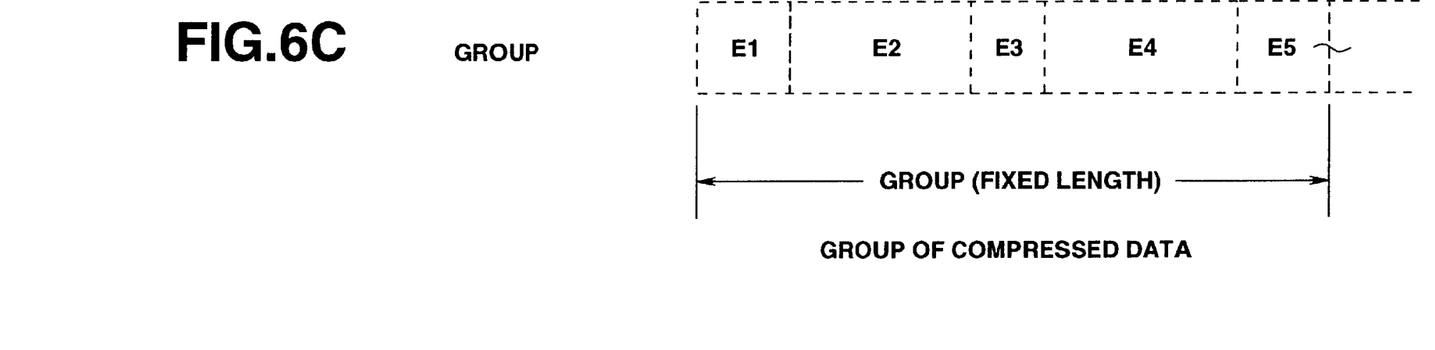

FIG. 6 illustrates the conversion of the compressed data of a fixed length record format into the groups for recording on the magnetic tape.

The fixed length records (each having a size e.g. of 512 bytes) shown in FIG. 6A will be different from one another in the size when carry the compressed data introduced in a sequence and compressed in the streaming tape drive. If the fixed length records are directly shifted to the groups by the same manner as of not compressed data, they may fail to be played back correctly.

In order to allow for correct playback the records carrying the compressed data are divided into units called entities before being grouped. The entity composed of the records of the compressed data is constructed in the buffer memory 23 in response to a control command from the system controller 15 of the streaming tape drive shown in FIG. 1. Although the entity is composed of four records in FIG. 6, it may be constructed with any number of the records.

FIG. 6B shows a structure of the entity. An entity head indicative of the convent of the data is provided at the leading end of the entity and followed by the records of the compressed data. The entity head will be explained later.

Then, a number of the entities, e.g. E1, E2, E3, E4, and E5, are grouped to a fixed length, as shown in FIG. 6C. The access entry of BAT shown in FIG. 5 is accompanied with each entity. Accordingly, the compressed data are stored in the groups on the magnetic tape 3.

Figure 7:
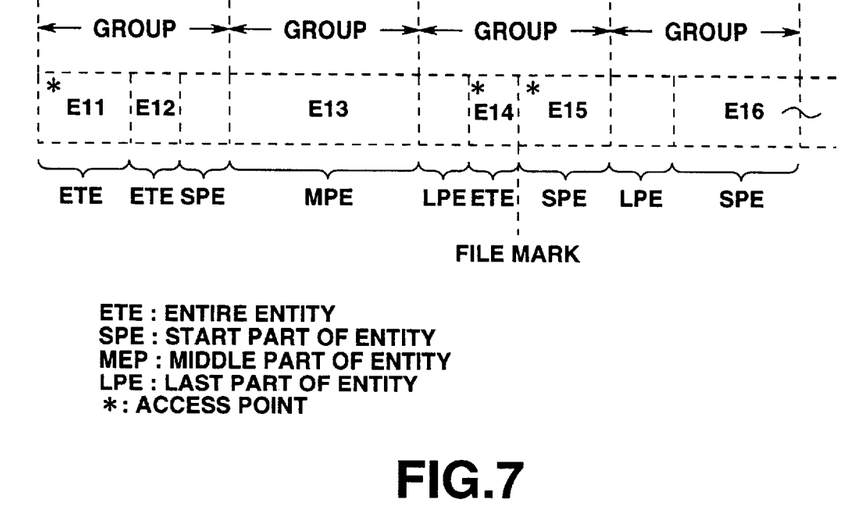
FIG. 7 is an explanatory view of allocating entities to the groups.

FIG. 7 illustrates allocation of the variable length entities to the fixed length groups. As shown in FIG. 7, when the data of the entities E11, E12, E13, E14, and E15 is grouped, the entities are classified into two types; one included in the group (E11, E12, or E14) and also the other (E13, E15, or E16) which extends over two or more consecutive groups.

The entity of the former type is designated by BAT as an "entire entity".

Also, the entity of the latter type which bridges between the two groups, e.g. E15, is designated with its front region as a "start part entity" and its rear region as a "last part entity".

The entity of the latter type which extends over the three groups, e.g. E13, is designated with its first region as a "start part entity", its second region as a "middle part entity", and its third region as a "last part entity".

A file mark is provided between the entities E14 and E15 which identifies the location of an interface between two data files. More specifically, the entities E14 and E15 are saved as two different data files respectively. Although not shown, a save set mark is flagged at the end of the data which has been recorded by a single (recording) operation.

Each of the entities E11, E14, and E15 is accompanied at its leading end with a sign of "*" which represents an access point for identifying the start location of the first record in an entity with e.g. LBOT, the separator marks (including the file mark and the save set mark), or entity attributes having been modified.

Figure 8:
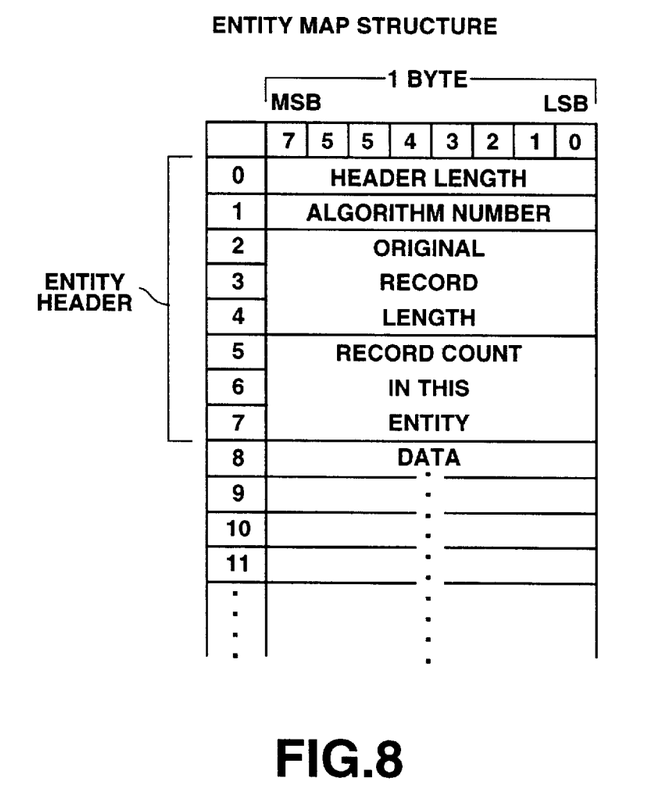
FIG. 8 is an explanatory view showing an entity map structure of the entity.

During playback, the access point is identified thus allowing the data in the entity to be processed corresponding to the entity attributes. Simultaneously, the data is accessed and read on the entity-by-entity basis from the magnetic tape 3 by referring to GIT and BAT before transferred via the SCSI interface 20 to the host computer 25. FIG. 8 shows an entity map structure of the entity.

As shown, the entity includes a string of bytes, each byte having bit numbers 0 (LSB) to 7 (MSB). The data of each byte is numbered by numerals starting from zero.

The entity header shown in FIG. 6B is composed of 8 bytes from the byte number 0 to the byte number 7. The byte number 0 carries a data of "header length" indicative of the length of the entity header data. For example, if the access point is located in the current entity, the recording starts with the byte number n which is defined by the header length. In this embodiment, a quantity of data to be saved is specified by n=8.

The byte number 1 carries a data of "algorithm number".

The byte numbers 2 to 4 save a data e.g. of "original record length" indicating the original data length of the record. As shown, the original record length is 512 bytes.

The remaining byte numbers 5 to 7 carry a data of "record count in this entity" showing the number of the records in the entity. The number of the records may include the file marks indicative of the interface between two data files and the save set marks indicative of the location of end of the recording action in the records.

The bytes denoted by the byte number 8 and higher contain the data of the records and one entity is completed.

A procedure of allocating the entities of a variable length data unit to the groups of a fixed length data unit in the digital data recording method of the present invention is now explained with reference to comparisons. It is assumed that the entity composed of a header H1 and records 1 to (n+1) of the compressed data is allocated to two consecutive groups N and N+1.

Figure 9:
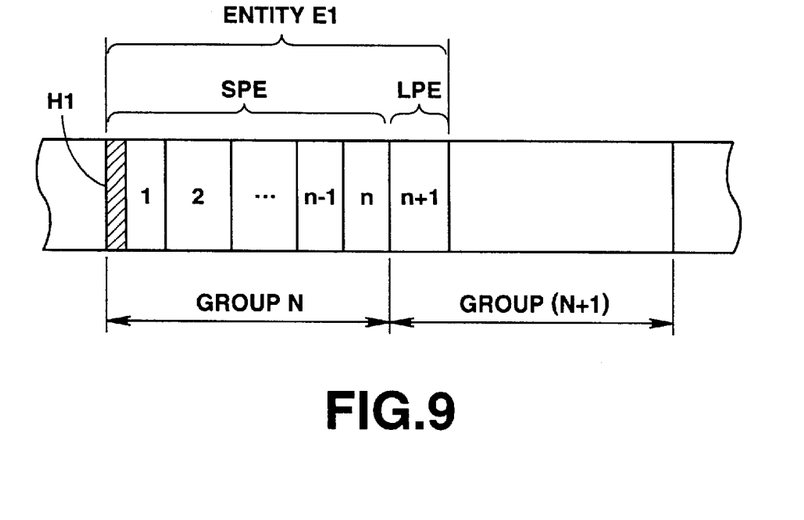
FIG. 9 is an explanatory view showing a conventional digital data recording method.

FIG. 9 illustrates a comparative example of digital data recording method where the entity El is allocated to two consecutive groups. It is assumed that the records 1 to n stored in the group N are of SPE (start part of entity) and the record n+1 stored in the group N+1 is of LPE (last part of entity).

When the record n+1 is desired for playback, the header H1 carrying a data indicative of the record n+1 is first accessed since the access action is based on a unit of the group and its data is used for reading out the data in the group N in a sequence from the record 1 to the record n. This requires an extra period of time for reading the other data than the required record data in the group N.

Figure 10:
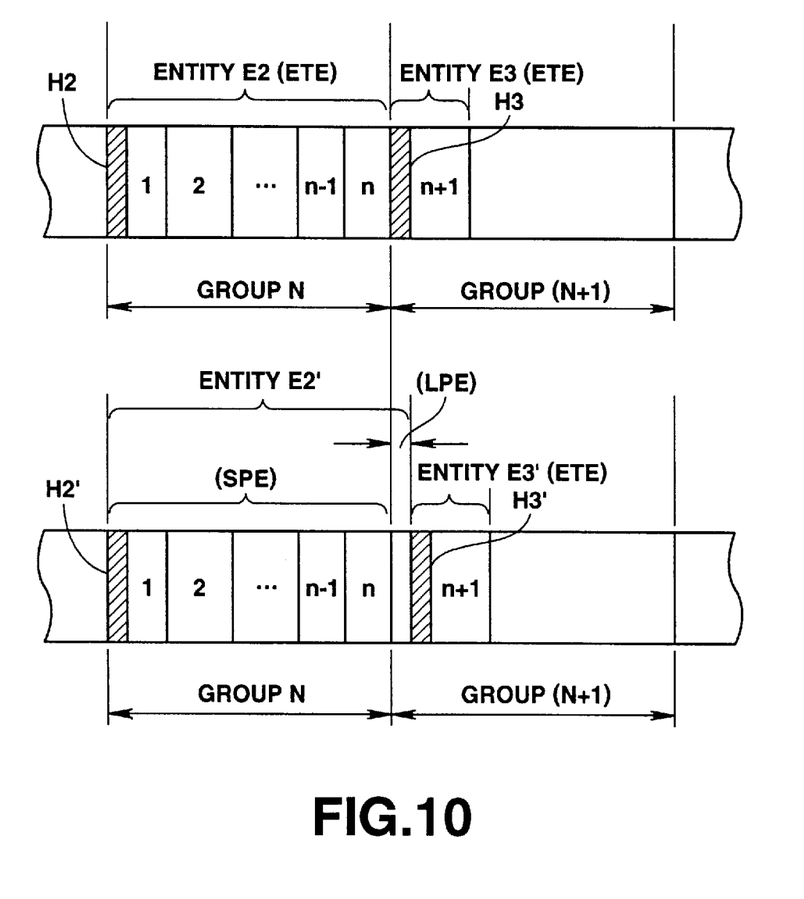
FIG. 10 is an explanatory view showing a digital data recording method of the present invention.

FIG. 10 shows the digital data recording method of the present invention where the entity is allocated to two consecutive groups while eliminating the above drawback.

The system controller 15 examines whether the record of compressed data produced by the compression/expansion circuit 21 is terminated at the end of a group or not before its action moves to the following steps.

FIG. 10(a) illustrates the record n in an entity E2 is terminated at the interface between the groups N and N+1, i.e. the end of a preceding one of the two consecutive recording units. Accordingly, the record n+1 following the record n is stored in the group N+1. Simultaneously, the records 1 to n stored in the group N and a header H2 carrying a data of the records 1 to n are designated as ETE (entire entity) of the entity E2 and also the record n+1 stored in the group N+1 is designated as ETE of the entity E3. The entity E3 is then added with a header H3 carrying a data indicative of the record n+1.

FIG. 10(b) shows the record n in an entity E2' is not terminated at the end of the group N but extends to the group N+1. Accordingly, the records 1 to n−1 stored in the group N, the record n of which portion is stored in the group N+1, and a header H2' carrying a data of the records 1 to n are designated as STE of the entity E2'. Also, the rear part of the record n stored in the group N+1 is designated as LPE of the entity E2'.

The record n+1 stored in the group N+1 is designated as an entity E3' and a header H3' carrying a data indicative of the group N+1 is added to the entity E3'. When the entities have been modified as described above, the dictionary data used for the data compression is cleared.

According to the above mentioned method of the present invention, the variable length entities and fixed length groups allow any compressed data record carrying a desired data to be accessed at a higher speed than that which can be achieved through conventional systems.

More specifically, in the digital data recording method of the present invention shown in FIG. 10, the retrieving of a desired data, e.g. the record n+1, can be implemented through directly accessing the header H3 or H3' which carries a data of the record n+1. Therefore, the access to the group N for reconstruction of a dictionary data is not needed and the reading of the records 1 to n is omitted. Accordingly, as the period required for performing the access is eliminated, the retrieval of data for playback will be much speeded up.

In a digital data recording method and a digital data recording medium according to the present invention, compressed data to be played back is divided into groups of a fixed length recording unit through reconstructing the data in the form of entities, each composed of a variable length data carrying a number of the groups, and assigning portions of each particular entity, which extends over two or more groups, as corresponding entities provided with their respective headers. This allows the efficiency of use of the storage area of the recording medium to be increased and any desired one of the stored data to be accessed and retrieved at a higher speed.

What is claimed is:

1. A method for recording a sequence of fixed length data records that has been compressed into a sequence of respective variable length units according to a dictionary, said units being recorded on a recording medium in the form of a sequence of fixed length groups, said method comprising the steps of:

dividing said plurality of variable length units into a sequence of entities, each of said entities including a plurality of said units;

associating said sequence of entities with said sequence of fixed length groups, wherein when one of said entities extends over a boundary between two of said groups by more than one variable length unit and not by an integer number of variable length units, said entity is terminated at the end of the variable length unit that spans the boundary and a new entity is begun at the beginning of the variable length unit immediately following the variable length unit that spans the boundary; and recording, said entities Generated in said dividing and associating steps into said groups such that the sequence of said variable length units is not changed;

wherein each group includes at least two index tables, a fixed size index table of a predetermined size and a variable size index table of a size that may vary from group to group.

2. A recording medium, comprising:

a plurality of areas for respectively storing a sequence of fixed length groups; and a plurality of sub-areas within each said area for respectively storing a sequence of fixed length data records that has been compressed into a sequence of respective variable length units according to a dictionary;

wherein said plurality of variable length units are divided into a sequence of entities, each of said entities including a plurality of said units;

wherein said sequence of entities is associated with said sequence of fixed length groups such that when one of said entities extends over a boundary between two of said groups by more than one variable length unit and not by an integer number of variable length units, said entity is terminated at the end of the variable length unit that spans the boundary and a new entity is begun at the beginning of the variable length unit immediately following the variable length unit that spans the boundary; and wherein said entities are recorded into said groups such that the sequence of said variable length units is not changed; and wherein each group includes at least two index tables, a fixed size index table of a predetermined size and a variable size index table of a size that may vary from group to group.

3. The method according to claim 2, wherein each said entity includes dictionary data used to encode the entity.

4. The method according to claim 2, wherein said recording medium is a tape-like recording medium and each of said fixed length groups corresponds to a plurality of tracks.

5. The recording medium according to claim 2, wherein each said entity includes dictionary data used to encode the entity.

6. The recording medium according to claim 2, wherein said recording medium is a tape-like recording medium and each of said fixed length groups corresponds to a plurality of tracks.

* * * * *